US009088404B2

(12) United States Patent
Glende, Jr.

(10) Patent No.: US 9,088,404 B2
(45) Date of Patent: *Jul. 21, 2015

(54) POWERLINE COMMUNICATION RECEIVER AND RELATED METHODS

(71) Applicant: Landis+Gyr Technologies, LLC, Pequot Lakes, MN (US)

(72) Inventor: James Hilmer Glende, Jr., Baxter, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,703

(22) Filed: Apr. 22, 2014

(65) Prior Publication Data

US 2014/0226733 A1 Aug. 14, 2014

Related U.S. Application Data

(63) Continuation of application No. 13/334,538, filed on Dec. 22, 2011, now Pat. No. 8,711,995.

(51) Int. Cl.
| | |
|---|---|
| *H04L 7/027* | (2006.01) |
| *H04L 27/38* | (2006.01) |
| *H04L 27/26* | (2006.01) |
| *H04B 3/54* | (2006.01) |
| *H04L 7/04* | (2006.01) |
| *H04L 7/00* | (2006.01) |
| *H04L 5/00* | (2006.01) |

(52) U.S. Cl.
CPC ............... *H04L 7/027* (2013.01); *H04B 3/542* (2013.01); *H04B 3/544* (2013.01); *H04L 7/041* (2013.01); *H04L 27/2662* (2013.01); *H04L 27/38* (2013.01); *H04B 2203/5412* (2013.01); *H04L 5/0007* (2013.01); *H04L 7/007* (2013.01); *H04L 7/0029* (2013.01)

(58) Field of Classification Search
CPC ........... H04B 3/54; H04B 3/542; H04B 3/544
USPC .......................................... 375/360, 257, 355
See application file for complete search history.

(56) References Cited

U.S. PATENT DOCUMENTS

| | | | |
|---|---|---|---|
| 5,581,229 A | 12/1996 | Hunt | |
| 5,640,416 A | 6/1997 | Chalmers | |
| 6,154,488 A | 11/2000 | Hunt | |

(Continued)

FOREIGN PATENT DOCUMENTS

EP 1432139 6/2004

*Primary Examiner* — Kevin Kim
(74) *Attorney, Agent, or Firm* — Crawford Maunu PLLC

(57) ABSTRACT

Aspects of the present disclosure are directed towards a circuit-based apparatus for receiving data communications over power distribution lines that carry power using alternating current (AC). The apparatus has a processing circuit that is configured and arranged to receive an input signal representing the data communications over power distribution lines. For a quadrature encoded signal, the input signal is separated into intermediary signals representing a real portion of and an imaginary portion. The processing circuit can then determine timing information from the real portion of and the imaginary portion. The intermediary signals can then be decimated according to a variable rate of decimation that is responsive to the determined timing information. The decimated intermediary signals are also filtered.

19 Claims, 11 Drawing Sheets

(56) References Cited

U.S. PATENT DOCUMENTS

| | | |
|---|---|---|
| 6,177,884 B1 | 1/2001 | Hunt et al. |
| 6,263,195 B1 | 7/2001 | Niu et al. |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2004/0128088 A1 | 7/2004 | Laletin et al. |
| 2006/0062363 A1 | 3/2006 | Albrett |
| 2008/0304595 A1 | 12/2008 | Haug et al. |
| 2010/0020908 A1 | 1/2010 | Goldfisher et al. |
| 2011/0007717 A1 | 1/2011 | Swarts et al. |
| 2011/0082654 A1 | 4/2011 | Dickens |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

CIC Frequency Response, fs = 480Hz, R=48, N=0

CIC Frequency Response, fs = 480Hz, R=48, N=0

POWERLINE COMMUNICATION RECEIVER AND RELATED METHODS

BACKGROUND

Service providers utilize distributed networks to provide services to customers over large geographic areas. For example, power companies use power distribution lines to carry power from one or more generating stations (power plants) to residential and commercial customer sites. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout several geographic regions and to receive data from customer locations including, but not limited to, data representing metered utility usage. However, data communication in a system that contains many thousands of endpoint devices, each communicating over the power distribution lines, can be particularly challenging. The sheer number of endpoint devices contributes to a host of issues including endpoint processing power, memory size, endpoint cost, interference and other concerns. For instance, synchronization between an endpoint and a device transmitting downstream to the endpoint can be complicated by these and other factors.

SUMMARY

The present disclosure is directed to systems and methods for use with communications requiring synchronization by a receiver that uses multiple sampling rates. These and other aspects of the present disclosure are exemplified in a number of illustrated implementations and applications, some of which are shown in the figures and characterized in the claims section that follows.

Certain embodiments of the instant disclosure are directed to decoding of data communications received at endpoint devices using reduced sampling rates for portions of the decoding process. A receiver circuit can be configured and arranged to decimate an oversampled version of an input signal. A decimated version of the input signal can then be used with various signal processing functions. Consistent with embodiments of the present disclosure, the oversampled version can be used to determine synchronization information that is used to provide synchronization by adjusting the decimation rate.

Embodiments of the present disclosure are therefore directed toward a circuit-based apparatus, and method of using the apparatus. The apparatus is configured with a processing circuit and for receiving data communications over power distribution lines that carry power using alternating current (AC). The processing circuit can be configured to receive an input signal representing the data communications over power distribution lines. This input signal can be represented by a modulated carrier wave operating at the given frequency. If desired, the input signal can be downconverted to baseband for signal processing. If the input signal uses quadrature modulation, then intermediary signals can be produced to separate a real portion from an imaginary portion of the input signal. The processor can then detect symbol boundaries by processing the intermediary signals at an initial (oversampled) sample rate. Decimation is then performed to reduce the initial sample rate of the intermediary signals according to a decimation rate. The intermediary signals, now sampled at the reduced sample rate, can then be filtered. As discussed herein, the decimation can be particularly useful in combination with filters that provide feedback, as the feedback may require more memory or processing for higher sampling rates. The processing circuit can then determine a timing mismatch between the detected symbol boundaries and samples corresponding to the reduced sample rate. The decimation rate is then adjusted in response to the determined timing mismatch.

One or more particular embodiments are directed toward a circuit-based apparatus for receiving data communications over power distribution lines that carry power using alternating current (AC). The apparatus has a processing circuit that is configured and arranged to receive an input signal representing the data communications over power distribution lines. For a quadrature encoded signal, the input signal is separated into intermediary signals representing a real portion and an imaginary portion. The processing circuit can then determine timing information from the real portion and the imaginary portion. The intermediary signals can then be decimated according to a variable rate of decimation that is responsive to the determined timing information. The decimated intermediary signals are also filtered.

Other embodiments are directed toward circuit-based apparatuses, and methods of using the apparatuses, for receiving data communications over power distribution lines that carry power using alternating current (AC). The apparatus can include one or more processing circuits used (or configured and arranged) to receive an input signal representing the data communications over power distribution lines. Intermediary signals are produced from each of a real portion of an input signal and an imaginary portion of the input signal. Symbol boundaries are detected by processing the intermediary signals at an initial sample rate. The initial sample rate of the intermediary signals is reduced/decimated according to a decimation rate. The intermediary signals are then filtered at the reduced sample rate. A timing mismatch is determined between the detected symbol boundaries and samples corresponding to the reduced sample rate. The decimation rate is adjusted in response to the determined timing mismatch.

Various embodiments of the present disclosure are directed toward a device having one or more processing circuits configured and arranged to include or provide a first integrator configured to generate a first integration output representing the integration of a real portion of a symbol. A second integrator is provided that is configured to generate a second integration output representing the integration of an imaginary portion of the symbol. Also provided is a signal strength indicator, which is configured to determine a signal strength from the first integration output and the second integration output. A decimator controller is configured to generate a decimator control signal in response to the signal strength. A first decimator is configured to reduce a first sample rate of the first integration output to a sample rate that is controlled by the decimator control signal. A second decimator is configured to reduce a second sample rate of the second integration output to a sample rate that is controlled by the decimator control signal. Also part of the device is a first comb filter configured to filter the output of the first decimator. A second comb filter is configured to filter the output of the second integrator.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
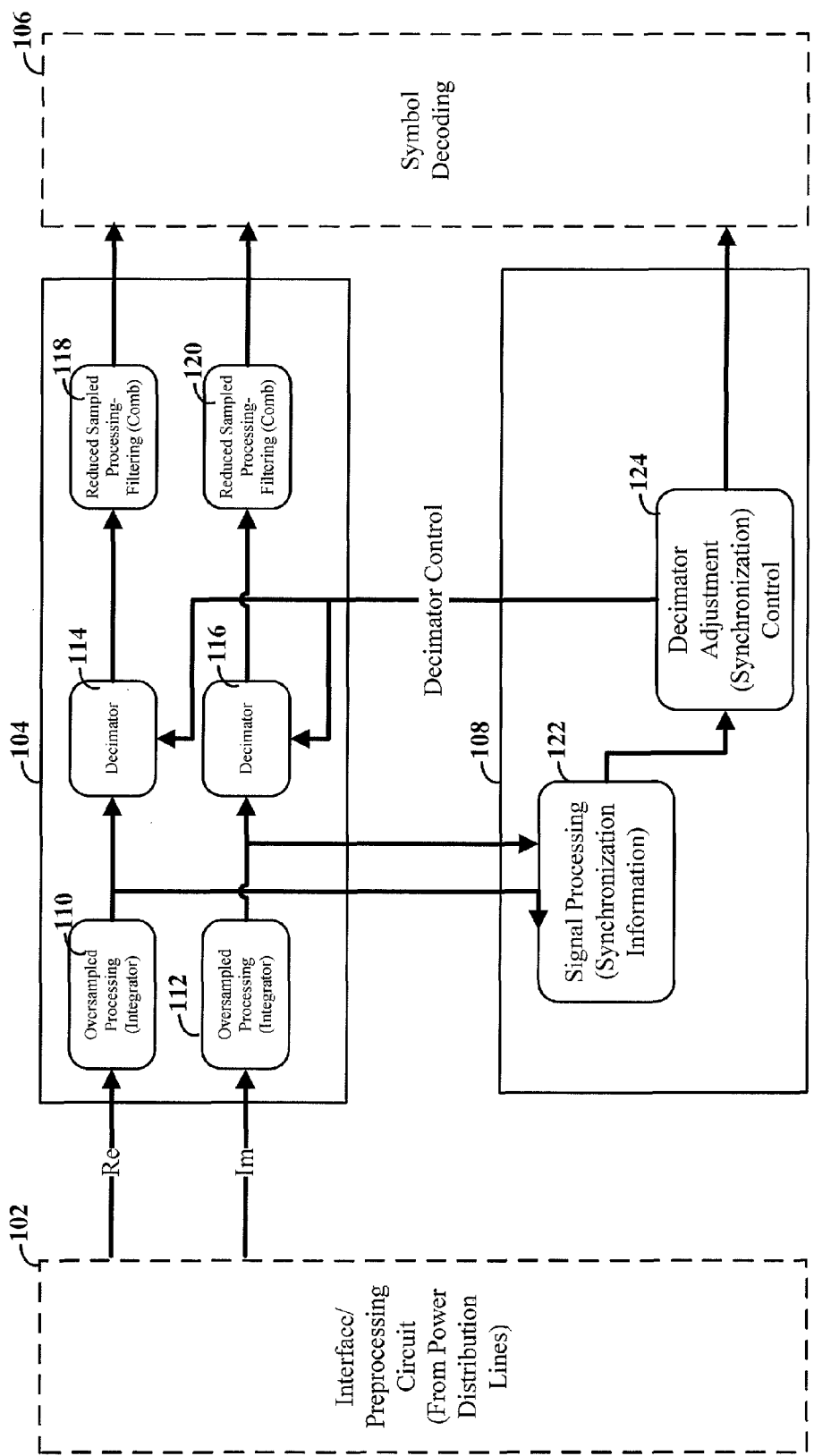
FIG. 1 depicts a block diagram of one or more processing circuits, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for providing synchronization correction. While the present disclosure is not necessarily limited to such applications, various aspects of the disclosure may be appreciated through a discussion of various examples using this context.

Example embodiments of the instant disclosure are directed to a method, device, system or apparatus that is designed to facilitate the decoding of data communications received at endpoint devices. For instance, a receiver circuit for an endpoint can be configured and arranged to use an oversampled version of a received signal for a first processing portion. The oversampled version can then be decimated to a reduced sample rate for a second processing portion. The use of a reduced sample rate can be particularly useful for reducing processing and/or storage requirements relating to processing of the samples. For instance, an accumulator can operate with less operations and a feedback component can operate with less memory/storage requirements. Consistent with embodiments of the present disclosure, the oversampled version can be used to determine synchronization information relative to decoding elements that operate on the reduced sample rate version of the input signals.

In more particular embodiments of the present disclosure, synchronization can be effected by adjusting the rate of decimation. This allows for a fine tuning of the time at which the symbol decoding elements receive the samples (where the symbol decoding elements operate using the reduced sample rate version of the signals). This is due to the decimation rate being linked to the time between selected samples from the oversampled version.

Various embodiments of the present disclosure recognize that symbol timing information can be obtained from the oversampled version without direct feedback from the symbol decoding process. Thus, embodiments provide synchronization without a feedback loop from symbol decoding logic. More particular embodiments recognize that this symbol timing information can be obtained using an algorithm for detecting signal power from a mathematical integration of the real and imaginary portions of the oversampled version of the signals.

Embodiments of the present disclosure are therefore directed toward a circuit-based apparatus, and method of using the apparatus. The apparatus is configured with a processing circuit for receiving data communications over power distribution lines that carry power using alternating current (AC). The processing circuit can be configured to receive an input signal representing the data communications over power distribution lines. This input signal can be represented by a modulated carrier wave operating at a given frequency. If desired, the input signal can be downconverted to baseband for signal processing. If the input signal uses quadrature modulation, then intermediary signals can be produced to separate a real portion from an imaginary portion of the input signal. The processor can then detect symbol boundaries by processing the intermediary signals at an initial (oversampled) sample rate. Decimation is then performed to reduce the initial sample rate of the intermediary signals according to a decimation rate. The intermediary signals, now sampled at the reduced sample rate, can then be filtered. As discussed herein, the decimation can be particularly useful in combination with filters that provide feedback, as the feedback may require more memory or processing for higher sampling rates. The processing circuit can then determine a timing mismatch between the detected symbol boundaries and samples corresponding to the reduced sample rate. The decimation rate is then adjusted in response to the determined timing mismatch.

For particular embodiments of the present disclosure, the filter is a comb filter that uses a delay parameter. The delay parameter relates to the time over which signal information is stored and used for feedback in the filtering. For a given delay time, the amount of stored data is directly related to the sample rate. Thus, if the sample rate is reduced, the amount of data stored and/or processed as part of the feedback is also reduced.

Aspects of the present disclosure recognize that for a given sample rate, adjustments to the rate of decimation result in a modification to the time at which decimated samples are selected/recorded. Accordingly, the timing of decimated samples, relative to the input signal, can be adjusted by changing the decimation rate. The adjustment can be used to provide synchronization for subsequent decoding.

One or more particular embodiments are directed toward a circuit-based apparatus for receiving data communications over power distribution lines that carry power using alternating current (AC). The apparatus has a processing circuit that is configured and arranged to receive an input signal representing the data communications over power distribution lines. For a quadrature encoded signal, the input signal is separated into intermediary signals representing a real portion and an imaginary portion. The processing circuit can then determine timing information from the real portion and the imaginary portion. The intermediary signals can then be decimated according to a variable rate of decimation that is responsive to the determined timing information. The decimated intermediary signals are also filtered.

Consistent with certain embodiments of the present disclosure, the filter includes a delay feedback component and the timing information is determined using data obtained from integration of the intermediary signals. In some instances, this obtained data can be used to determine a received power level for a transmitted symbol.

In certain embodiments, the processing circuits can be configured and arranged for use within a communication system that uses power distribution lines to communicate data between a command center and endpoint devices using intermediary data-collecting nodes (collectors). This type of system can be particularly useful for meter usage reporting as well as other functions. For instance, data can be provided from power meters, gas meters and water meters, which are respectively installed in gas and water distribution networks. Moreover, while the present disclosure generally refers to the endpoints as providing utility data (e.g., power) from utility meters, other data can also be communicated. The interface to the command center can be implemented using a variety of different communication networks including, but not limited to, a wide-area network (WAN) using Ethernet.

Consistent with embodiments of the present disclosure, each collector can be configured to be in communication with thousands of endpoints and there can be thousands of collectors in connection with a command center. Thus, there can be millions of total endpoints and many thousands sharing communications on a common power distribution line. Accordingly, embodiments of the present disclosure are directed toward communicating, coordinating and interpreting data relative to constraints of the system. The following discussion provides an overview of various aspects of the system as relevant to some of these constraints.

The endpoints can be designed to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints report the operating characteristics of the network using communications channels. In certain embodiments, the communications channels are represented by portions of the frequency spectrum. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique.

When the endpoints are implemented as power meters in a power distribution network, the power meters transmit reporting data that specify updated meter information. The updated meter information can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In some implementations, symbols (representing one or more bits representing reporting and/or the status data) are transmitted on the power distribution lines over a specified symbol period. A symbol period is a period of time over which each symbol is communicated. A number of symbols are contained within a frame period, representing the time over which a complete frame is communicated, wherein each frame provides synchronization for symbols of the same frame.

According to certain embodiments of the present disclosure, the collectors are installed in substations and used to control bidirectional communication with both the command center (e.g., located at a utility office) and endpoints (e.g., located at metering locations for customer sites). This messaging to the endpoints can be sent to an individual endpoint, or broadcast simultaneously to groups of endpoints or even sent to all endpoints connected to the collectors. Consistent with certain embodiments, the collectors are built according to an industrial-grade computer specification in order to withstand the harsh environment of a substation.

Turning now to the figures, FIG. 1 depicts a block diagram of one or more processing circuits, consistent with embodiments of the present disclosure. Consistent with particular embodiments, the components of FIG. 1 can be located in an endpoint receiver that is configured to receive communications carried over power distribution lines. An interface circuit 102 can provide isolation from high voltages present on the power distribution lines while allowing for the receipt of data transmitted by one or more collectors. This can also include a filter to remove noise and harmonics generated by the power-providing AC present on the power distribution lines. Moreover, for quadrature modulation, the interface circuit 102 can separate out the real (Re) and imaginary portions (Im) of a received signal. Consistent with certain modulation schemes, these intermediary signals can be generated from a downconverted (baseband) version of a received signal.

Processing circuit(s) 104 and 108 provide functions associated with a high sampling rate (oversampled) and a lower/decimated sampling rate. Oversampled processing functions 110 and 112 can be performed on both the real and imaginary portions of the intermediary signals. For instance, the oversampled processing 110 and 112 can provide an integrator function based upon the oversampled rate. This produces an output signal having a granularity/accuracy consistent with the oversampled rate.

Decimators 114 and 116 receive the oversampled output of processing functions 110 and 112, respectively. Decimators 114 and 116 then produce an output at a reduced sampling rate. The ratio between the input (over)sampling rate and the output (decimated) sampling rate represents the decimation rate for decimators 114 and 116. This decimation rate can be adjusted as discussed herein.

Decimated sampling functions 118 and 120 can then be undertaken upon the outputs of decimators 114 and 116. Aspects of the present disclosure are directed toward the use of decimated sampling functions 118 and 120 that have reduced memory and/or processing when using lower sampling rates. For instance, the decimated sampling functions 118 and 120 can include, but are not limited to, a filter that uses a feedback component that stores previous samples. In specific embodiments, the filtering represents a comb filter.

Symbol decoding 106 can then be performed on the output of the decimated sampling functions 118 and 120. For instance, the modulation scheme could use one of quadrature phase shift keying (QPSK), differential phase shift keying (DPSK) and frequency shift keying (FSK). Symbol decoding 106 could be configured to demodulate accordingly. In a particular instance, symbol decoding 106 can include a phase delta discriminator for detecting phase shifts.

Processing circuit(s) 108 can be configured and arranged to generate synchronization information using signal processing function 122. Signal processing function 122 receives oversampled signals from processing functions 110 and 112 and uses this information to generate synchronization information. This synchronization information is used to determine a decimator adjustment 124. The decimator adjustment 124 is provided as a decimator control to change the decimation rate of decimators 114 and 116 to provide synchronization between received signals and processing of the circuits.

In certain embodiments of the present disclosure, signal processing function 122 detects symbol boundaries while decimator adjustment 124 represents an adjustment made to align the detected symbol boundaries with the decimated sampling.

Figure 2:
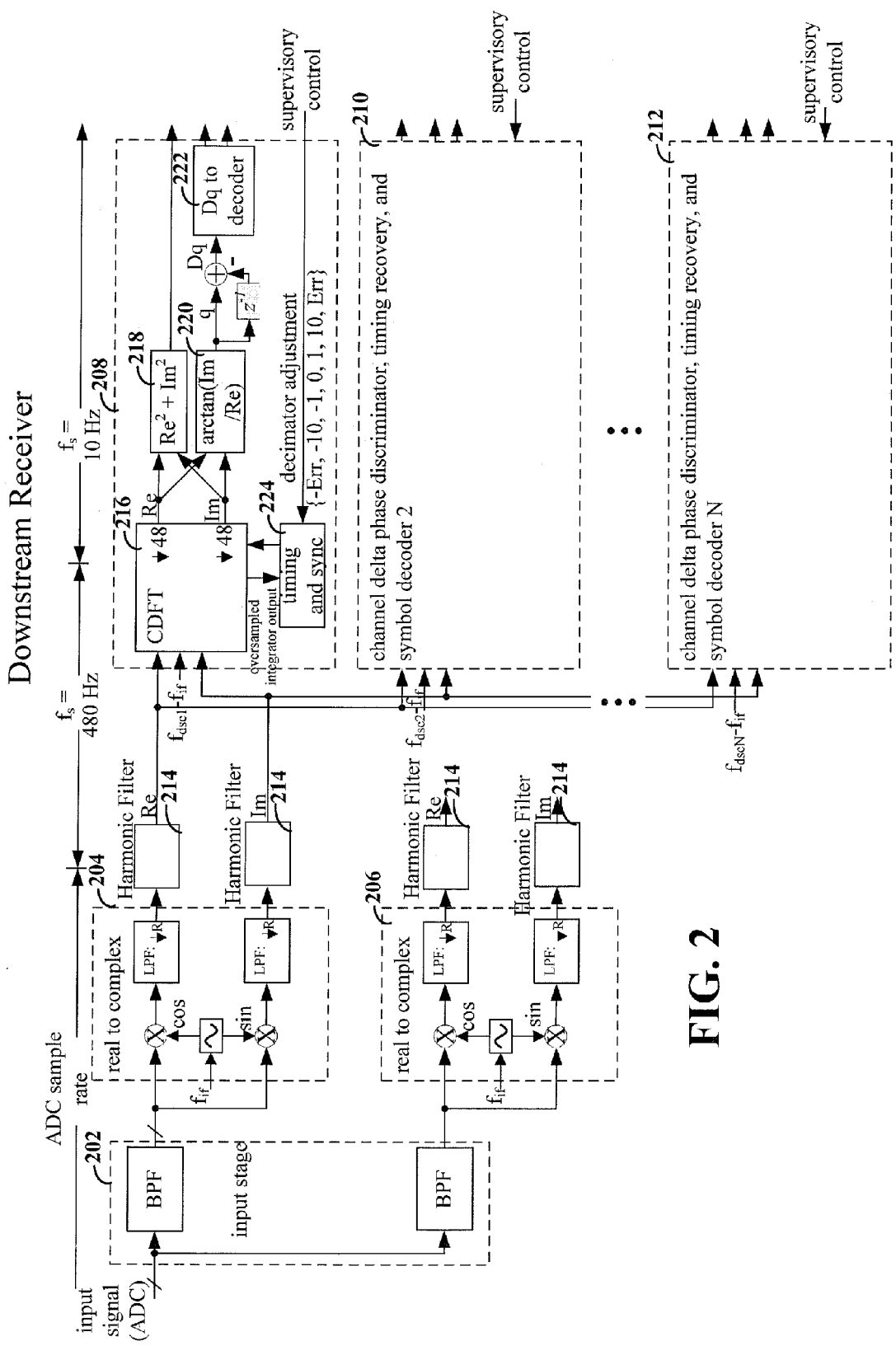
FIG. 2 depicts a block diagram for a downstream (endpoint located) receiver, consistent with embodiments of the present disclosure.

FIG. 2 depicts a block diagram for a downstream (endpoint located) receiver, consistent with embodiments of the present disclosure. The receiver is configured and arranged to process communications in multiple different frequency bands/channels. As depicted in the figure, a digital input signal is provided to input state 202 from an analog-to-digital converter (ADC). Input stage 202 can include several band pass filters (BPFs), each BPF having a pass frequency corresponding to a respective communication channel. Downconverters 204 and 206 can be used to downconvert the filtered signals according to an intermediate frequency ($F_{if}$). Downconverters 204 and 206 can also be configured to separate out real and imaginary portions of the incoming signal by mixing cosine and sine signals, respectively.

Consistent with certain embodiments, the sample rate (or sample frequency) of the ADC can be a relatively high rate. This can be particularly useful for bandpass filtering and downconverting, which can be accomplished with relatively low processing and memory requirements for high sample rates. Other functions, however, may become prohibitively burdensome at high sample rates. Accordingly, downconverters 204 and 206 can be configured to provide decimation to lower the sample rate. The particular example depicted in FIG. 2 is a sample rate of 480 Hz, although the receiver and relevant disclosures are not limited to this rate.

According to an embodiment of the present disclosure, harmonic filtering 214 can be provided to filter out certain frequencies. These filters can be particularly useful for filtering harmonics that might be generated by the power-providing AC. This AC frequency, and resulting harmonics, can vary around a frequency of about 60 Hz in the United States and around 50 Hz in Europe. These standards, however, are relatively arbitrary and do not necessarily limit the various embodiments discussed herein.

Processing blocks 208, 210 and 212 receive the outputs of respective harmonic filters 214. For PSK-encoded symbols, these processing blocks provide delta phase discrimination, timing recovery and symbol decoding. More particular functions include a complex discrete Fourier transform (CDFT) 216, a power determination 218, a phase detector 220, a symbol decoder 222 and a synchronization block 224. CDFT block 216 provides signal processing and filtering useful for decoding symbols. CDFT block 216 also provides decimation that reduces the sample rate. The particular example depicted in FIG. 2 is a reduced sample rate of 10 Hz, although the receiver and relevant disclosures are not limited to this rate. Phase detector 220 detects modulations to the phase of the carrier wave for the input signal. Symbol decoder 222 decodes the detected phase changes to generate corresponding data. Power determination 218 determines the power of the received signal as measured by a combination of both the real and imaginary portions of the signal.

Synchronization block 224 provides a control signal used to change the decimation rate of the CDFT block 216. Adjustments to the decimation rate result in a corresponding change in the timing for the selection of the samples. In this manner, synchronization block 224 can adjust the timing of the components that operate using the reduced sample rate.

Consistent with certain embodiments of the present disclosure, the synchronization block 224 receives input from the CDFT block 216 before decimation to the reduced sample rate. In the particular example of FIG. 2, this would correspond to the 480 Hz sample rate. Accordingly, the synchronization block 224 can monitor signal parameters using this higher sample rate. Synchronization block 224 can use this information to detect symbol boundaries. Synchronization block 224 can also receive timing data corresponding to the reduced sample rate and determine mismatches between the symbol boundaries and the reduced sample rate. For instance, the timing of samples that are taken for the reduced sample rate (determined by the decimator) can be synchronized to the phase detector 220 and/or symbol decoder 222.

In more specific embodiments, the CDFT block 216 can include a filter circuit with an integrator function that operates at the higher sample rate. Data from the integrator can be provided to the synchronization block 224. Synchronization block 224 uses this data to detect symbol boundaries by, for instance, monitoring the signal power. The various additional diagrams and associated discussion provided hereafter may relate to one or more experimental embodiments of the present disclosure. These experimental embodiments can be useful in that they provide several reference points and illustrative examples. Notwithstanding, the specifics of each experimental embodiment may not be required in (or even particularly relevant to) all embodiments of the present disclosure.

Figure 3:
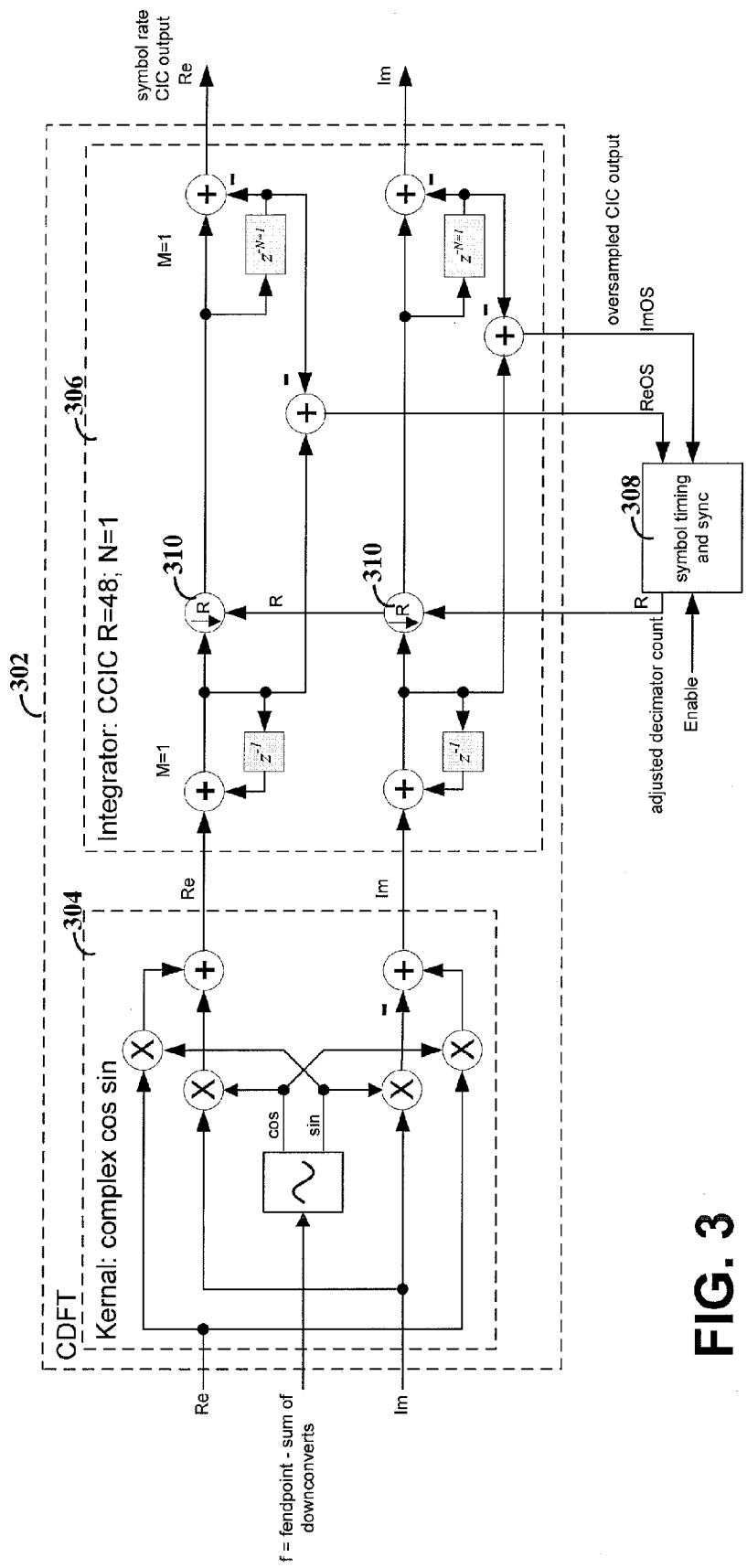
FIG. 3 depicts a block diagram of a complex discrete Fourier transform (CDFT), consistent with embodiments of the present disclosure.

FIG. 3 depicts a block diagram of a CDFT, consistent with embodiments of the present disclosure. CDFT block 302 receives the real (Re) and imaginary (Im) portions of the data carrying signal. A transformation kernel 304 transforms the real and imaginary portions. Kernel 304 operates on the signal sampled at a first (over)sample rate. The kernel 304 is shown with a particular combination of mixers and combiners; however, the present disclosure is not necessarily limited to this specific combination.

The output of kernel 304 is provided to filter block 306. In the particular embodiment depicted in FIG. 3, filter block 306 operates as a complex cascaded comb integrator filter (CCIC). The CCIC filter includes decimators 310. The decimators 310 are configured and arranged to provide a variable decimation rate that is responsive to an input/control signal or value. The integration function of the CCIC filter is provided before the decimators 310 and therefore operates at the higher sample rate. The comb filter portion of the CCIC filter is provided after the decimators 310 and therefore operates at the lower sample rate. This can be particularly useful for simplifying/reducing the memory requirements of the comb filter because the comb filter includes a feedback component using previous values(s) as part of the filter.

A signal value from the integrators is provided to the symbol timing and synchronization block 308. This signal value can be adjusted according to the feedback component of the comb filter as shown by the adder symbol. Synchronization block 308 uses this information to generate a decimator adjustment value. The decimator adjustment value is provided to the decimators 310 using input/control signal/value.

In certain embodiments, the decimator adjustment value is calculated as a function of a mismatch between the end of a decimation section (defined according to timings between decimator samples) and symbol timings (which can be determined by monitoring the received power of the data carrying signal).

Figure 4A:
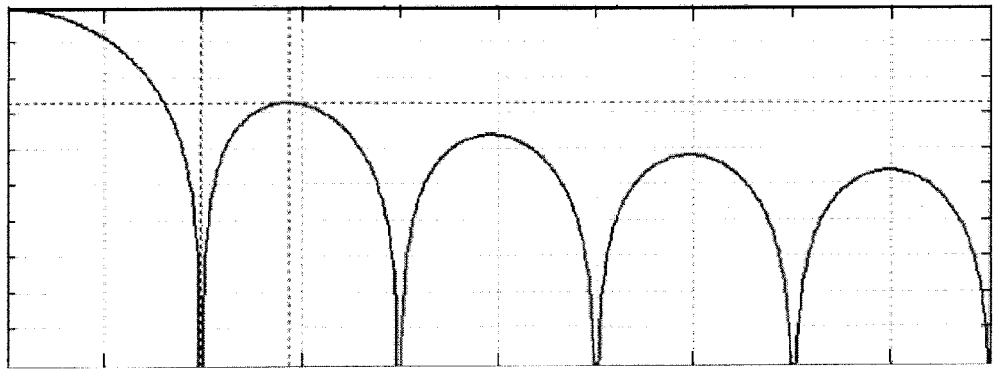
FIG. 4A is a graph of the frequency response of an experimental (cascaded integrator comb) CIC filter for M=1, consistent with embodiments of the present disclosure.
Figure 4B:
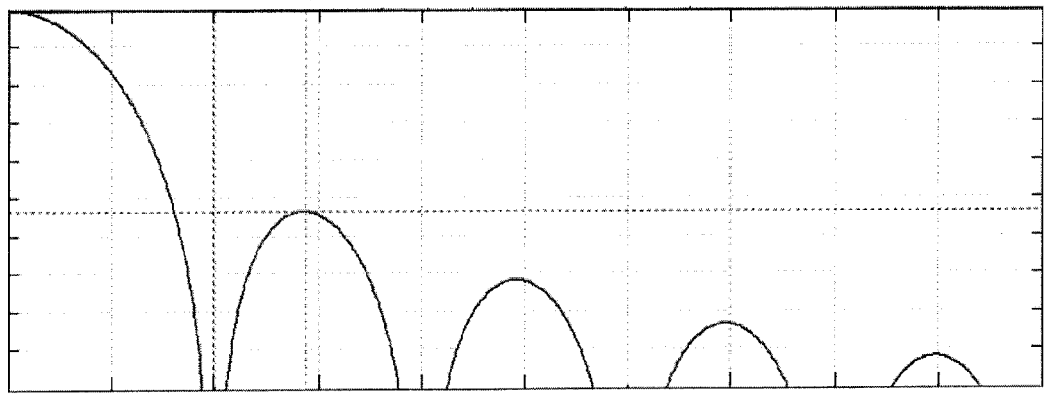
FIG. 4B is a graph of the frequency response of an experimental CIC filter for M=3, consistent with embodiments of the present disclosure.

FIG. 4A is a graph of the frequency response of an experimental CIC filter for M=1, consistent with embodiments of the present disclosure. FIG. 4B is a graph of the frequency response of an experimental CIC filter for M=3, consistent with embodiments of the present disclosure. For each of FIGS. 4A and 4B, the data represented by the graph was generated using a sampling rate: $f_s$=480 Hz and a decimation rate of 48. The transfer function is represented as:

$$|H(f)| = \left| \frac{\sin\left(\frac{\pi N R f}{f_s}\right)}{\sin\left(\frac{\pi f}{f_s}\right)} \right|^{M=1}$$

As shown by the graphs, the experimental data suggest that M=1 may provide better filter characteristics, however, the present disclosure is not limited thereto. For instance, different input characteristics and operating parameters may suggest other settings.

Figure 5:
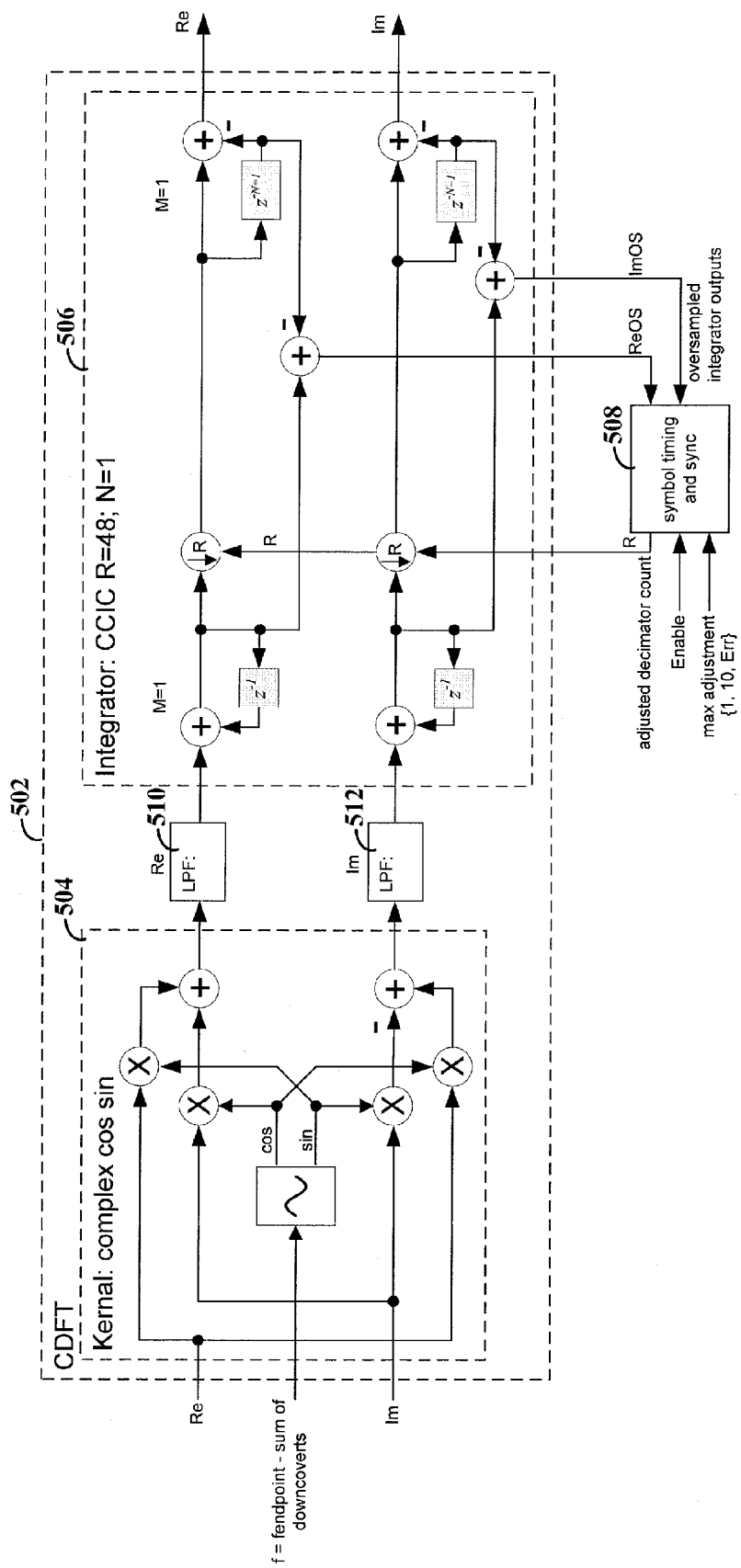
FIG. 5 depicts a block diagram of an alternative CDFT, consistent with embodiments of the present disclosure.

FIG. 5 depicts a block diagram of an alternative CDFT, consistent with embodiments of the present disclosure. Similar to the CDFT of FIG. 3, the CDFT of FIG. 5 includes a CDFT block 502, a transformation kernel 504, a filter block 506 and a synchronization block 508. FIG. 5, however, also includes low pass filter (LPF) 510 and 512. These LPFs 510 and 512 can be used to filter unwanted interference and harmonics. Somewhat unexpectedly, it has been discovered that the LPFs 510 and 512 may not provide an appreciable benefit for certain applications. Accordingly, the present disclosure contemplates embodiments with and without the LPFs 510 and 512.

Figure 6:
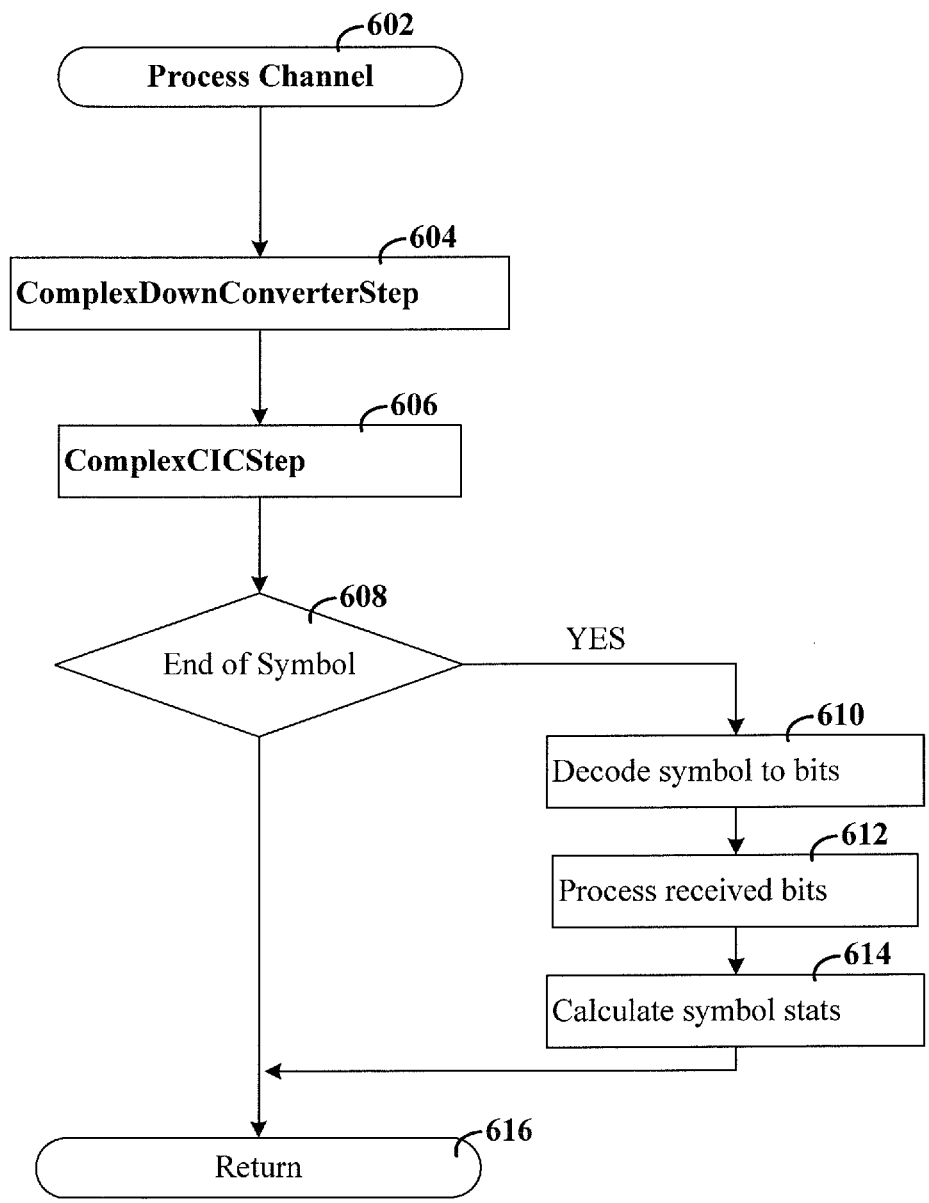
FIG. 6 depicts a flow diagram as an example of one way of implementing the processing and decoding of received symbols, consistent with embodiments of the present disclosure.

FIG. 6 depicts a flow diagram as an example of one way of implementing the processing and decoding received symbols, consistent with embodiments of the present disclosure. The flow diagram can be carried out using one or more processing circuits, which can be configured and arranged using, for instance, software-programmed instructions, hardware circuits and combinations thereof. The processing circuit(s) begins processing a particular channel at block 602. In certain embodiments, the processing circuit can be configured and arranged to perform this processing on several channels in parallel. For instance, an OFDMA protocol can be used and the processing circuit can monitor several different frequencies for the OFDMA protocol.

At block 604, the processing circuit is configured and arranged to perform a complex downconversion of a received signal. A description of a particular embodiment of complex downconversion is provided with reference to the kernel of FIGS. 3 and 5.

At block 606, the processing circuit is configured and arranged to perform a filtering function. A particular type of filtering is that of a complex cascaded integrator comb (CCIC) filter. An embodiment of a processing circuit-implementation of a CCIC filter is discussed with reference to FIG. 7.

The processing circuit determines, at block 608, whether or not the end of a symbol has been reached. Consistent with embodiments of the present disclosure, the end of a symbol is determined based upon the decimator count. If the end of a symbol has been detected, then the processing circuit can attempt to decode the symbol to produce corresponding data bits, as shown by block 610. The processing circuit can then process 612 the bits accordingly and, if desired, calculate symbol statistics at block 614. The statistics can include, but are not limited to average symbol power, average delta phase error, and maximum delta phase error. If the end of a symbol is not detected, then further processing is performed before the symbol is decoded. The process completes at step 616.

Figure 7:
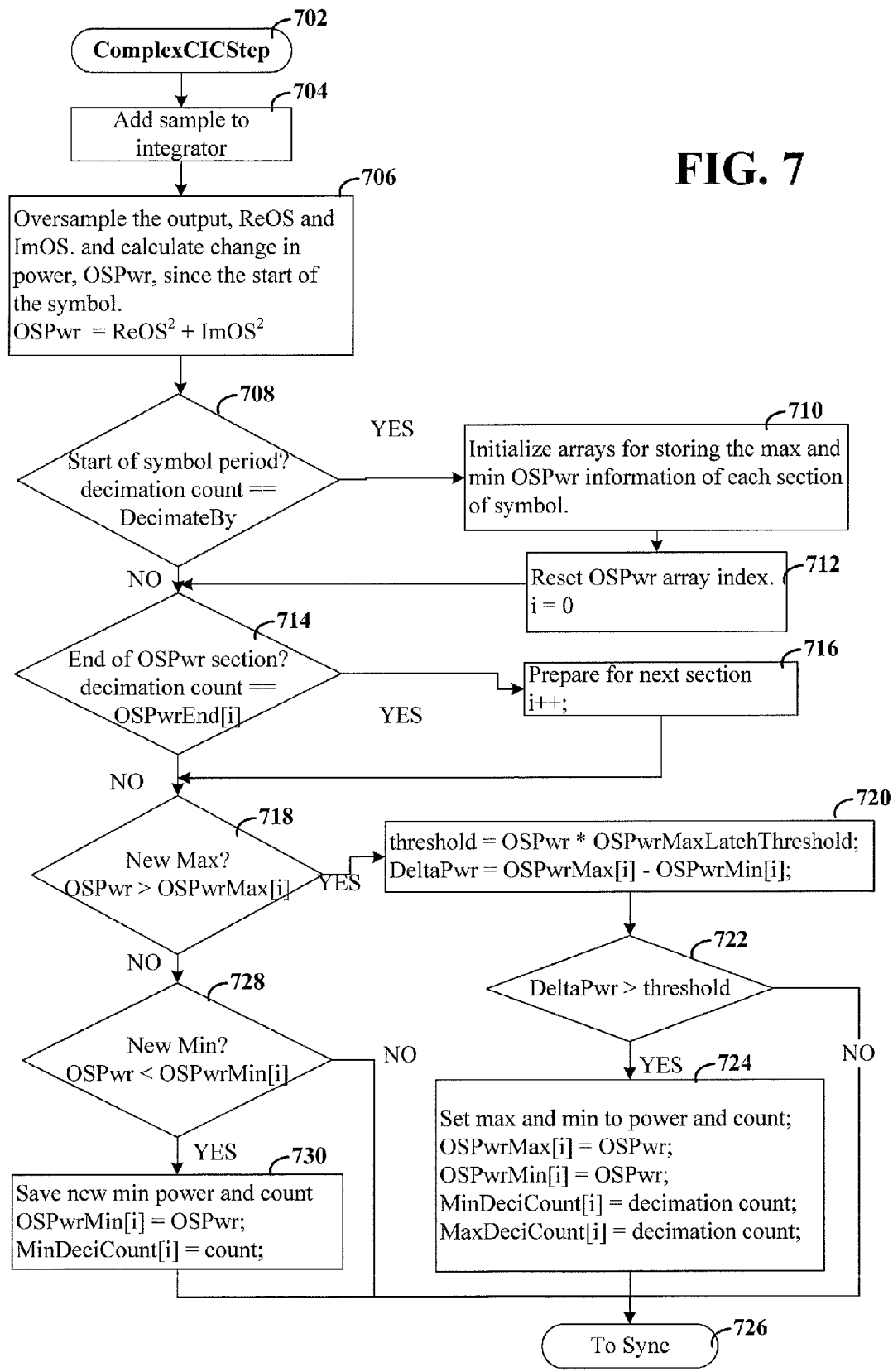
FIG. 7 depicts a flow diagram as an example of one way of implementing a complex cascaded integrator comb (CCIC) filter, which is consistent with certain embodiments of the present disclosure.

FIG. 7 depicts a flow diagram as an example of one way of implementing a complex cascaded integrator comb (CCIC) filter, which is consistent with certain embodiments of the present disclosure. The processing circuit begins the filtering process at block 702 and then advances to block 704. At block 704 the processing circuit can add the next sample to an integrator. The samples at this point have a high (over) sampled rate. The processing circuit uses the oversampled (OS) output of the integrator to determine the signal power (OSPwr) at block 706. This determined power can be used to calculate the change in power since the start of the current symbol. For instance, to determine the symbol power from both real (ReOS) and imaginary (ImOS) portions, the processing circuit can use the formula $OSPwr=ReOS^2+ImOS^2$.

The processing circuit can then check, at block 708, whether or not the start of a symbol period has been reached. In certain embodiments, the symbol period is assumed to correspond to the timing of the decimator sampling (absent a timing mismatch). Decimation can be implemented by taking every N samples, where N=the decimation rate ("DecimateBy"). For instance, a decimation count can be incremented for every received sample. The received samples are discarded unless the decimation count is equal to the decimation rate (or an integer multiple thereof if the count is not reset). A similar mechanism is assumed to be used in connection with the flow diagrams; however, the various embodiments are not necessarily limited to such a specific implementation. Accordingly, the check 708 can be accomplished by comparing a decimation count to the decimation rate (DecimateBy).

If the start of a symbol is detected by the processing circuit, then the processing circuit will initialize storage arrays for each section of the new symbol, per block 710. And the array index ("i") can be reset, per block 712. The symbol-based sections correspond to different sets of (over)samples within the symbol. For instance, a decimation rate of 48 results in (over)samples 1-48 being included on one symbol period. These samples can be broken into four different sections 1-12, 13-24, 25-36 and 37-48. An array value (OSPwrMax[i]) can be stored for each section (i).

The processing circuit checks, at block 714, for the end of one of these sections. This check can be accomplished, for instance, by comparing the decimation count against an array value for the current section (OSPwrEnd[i]). If the end of the current section has been reached, then the processing circuit prepares for the next session (e.g., by incrementing the section count "I," per block 716).

At block 718, the processing circuit compares the calculated (current) power (OSPwr) against a stored maximum power for the current section (OSPwerMax[i]). The current power being above the previous maximum indicates that the power has increased.

The current power being below the previous maximum indicates that the previous maximum is a local maximum/peak value (e.g., OSPwrMax[1] of FIG. 10).

When the current power is not above the previous maximum, the processing circuit proceeds to block 728. At block 728, the processing circuit checks the current power (OSPwr) against a stored minimum power for the current section (OSPwerMin[i]). The current power being below the previous minimum indicates that the power has decreased. The current power being above the previous minimum indicates that power is between the current maximum and minimum powers.

If necessary, the processing circuit updates the minimum power (OSPwerMin[i]) with the current power value (OSPwr) at block 730. The processing circuit also stores the decimator count corresponding to the new minimum power value. Thereafter, the processing circuit proceeds to a synchronization process 726.

When the current power is increasing relative to the previous maximum power, the processing circuit proceeds to block 720. At block 720, the processing block calculates a threshold value as a function of the current power and a threshold. Consistent with one embodiment of the present disclosure, the OSPwrMaxLatchThreshold can be set according to a predetermined value. For instance, a simulation can be used to model transmission of test frames and resulting signals as well as noise and power line harmonics as seen by the receiver. The simulation results can then be used to select a value for the OSPwrMaxLatchThreshold that reduces or minimizes the average delta phase error. In other instances, the OSPwrMaxLatchThreshold can be dynamically generated based upon actual conditions on the power distribution line. The use of a dynamically generated threshold can be particularly useful for adjusting to changes; however, there can be a tradeoff in terms of processing resources. When the current power is deemed sufficient (per the check of block 722), the processing circuit updates that array value for the current section as shown by block 724.

Figure 8:
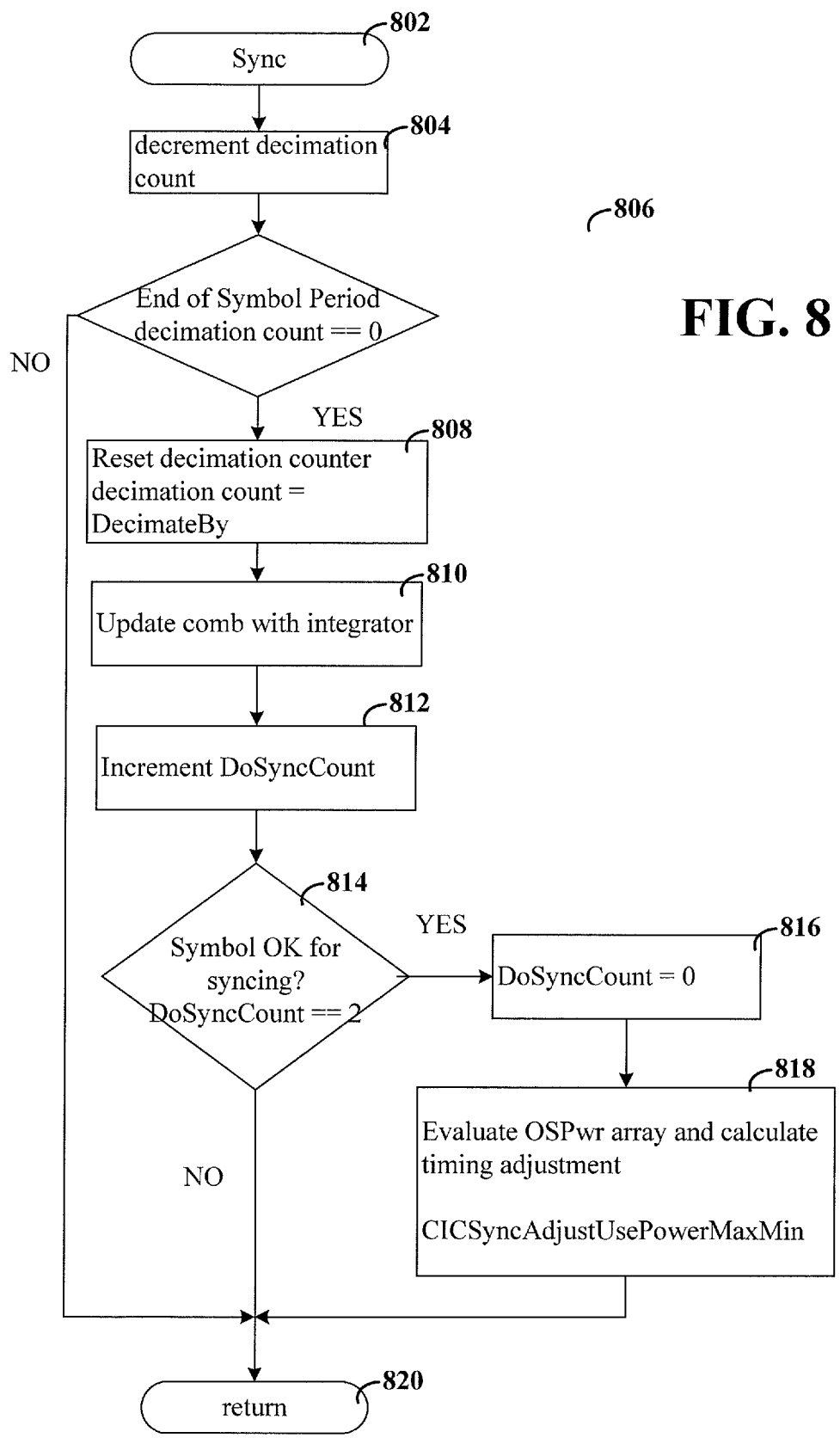
FIG. 8 depicts a flow diagram as an example of one way of implementing symbol synchronization, consistent with embodiments of the present disclosure.

FIG. 8 depicts a flow diagram as an example of one way of implementing symbol synchronization, consistent with embodiments of the present disclosure. The synchronization process can be entered once per (over)sample. The processing circuit enters the synchronization flow at block 802 and then proceeds to block 804. At block 804 the decimation count (DeciCount) can be decremented. For instance, the count can be initially set to the decimation rate and then decremented once per (over)sample until it reaches zero, which indicates that a decimated sample should be provided. Accordingly, if the decimation count reaches zero (determined at block 806), the processing circuit can assume that a new symbol period has begun. This particular method of keeping track of the decimation count is not meant to be limiting. For instance, there are many different ways to track the decimation, including, but not limited to, counting up from zero and/or detecting integer multiples of the decimation rate.

If the processor circuit determines that a new symbol period has not been reached, then it can exit the synchronization process at block 820. Otherwise, the processing circuit can reset the decimation counter to the current decimation rate (DecimateBy), as shown by block 808.

For a CIC filter, the processing circuit can also update the comb filter at step 810. For instance, the comb filter can use feedback based upon previous values. These previous values can be the decimated output of the integrated. Accordingly, the comb filter can be updated when a new decimated output is available.

Aspects of the present disclosure are directed toward communication protocols that use synchronization symbols that are used by a receiver. The receiver can then use the timing from these synchronization symbols to decode subsequent data symbols. In the particular communication protocol depicted in FIG. 8, the receiver is configured to avoid using the first transmitted synchronization symbol. Thus, the first synchronization symbol is effectively skipped because it may be corrupted (e.g., due to internal adjustment to receiver clocks). Moreover, the second synchronization symbol is likewise problematic because the timing problems of the first synchronization symbol may still be present during the next decimation cycle. This skipping of synchronization symbols is represented by blocks 812 and 814. In these blocks a synchronization count (DoSynchCount) is incremented each symbol period and the process exits when the count is less than 2.

Otherwise, the processing circuit can reset the synchronization count (DoSynchCount) at block 816. Thereafter, the processing circuit evaluates the values of the OSPwr array to calculate a timing adjustment at block 818.

Figure 9:
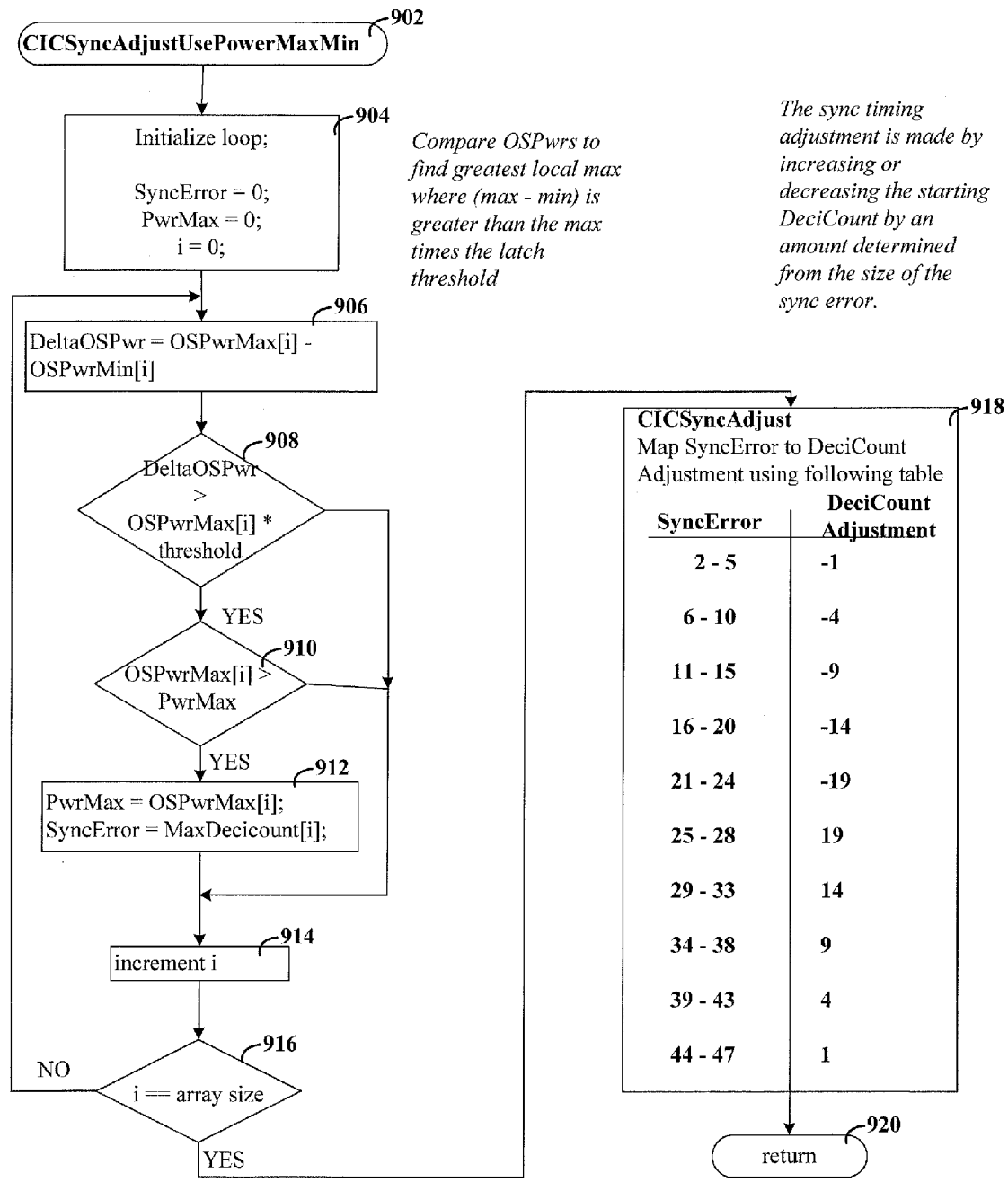
FIG. 9 depicts a flow diagram as an example of one way of determining a synchronization adjustment amount, consistent with embodiments of the present disclosure.

FIG. 9 depicts a flow diagram as an example of one way of determining a synchronization adjustment amount, consistent with embodiments of the present disclosure. The processing circuit can enter the process at block 902 in order to determine an adjustment amount for the decimator rate, where the adjustment amount is set to compensate for a timing mismatch. At block 904, the processing circuit initializes values used during the process. One of these values includes the current section value "i," which is used to index the array of values previously stored for each section of the current symbol period.

At block 906, the processing circuit calculates the difference between the power maximum (OSPwrMax) and minimum (OSPwrMin) for the current section. Block 908 represents a check for whether or not this calculated difference exceeds a threshold value. If the threshold value is not met, then the processing circuit will advance to the next section by incrementing the current section value at block 914. Assuming there are more sections, per the check of block 916, the processing circuit will repeat the process for these section(s). The failure to meet the threshold will generally indicate that the maximum and minimum are identical (or near enough) and therefore there is no synchronization error.

If the threshold level is exceeded, however, then the processing circuit will check to see if the power for the current section exceeds the power from previous sections, as shown by block 910. If previous sections have a higher power, then that processing circuit will advance to the next section by proceeding to block 914. Otherwise, the processing circuit will update the power maximum and synchronization error at block 912. In this manner, the processing circuit will use the synchronization error corresponding to the greatest power.

Once all of the sections have been processed, the processing circuit uses the stored synchronization error to determine an adjustment to the decimation rate. For instance, the adjustment value can be implemented as an adjustment to the start value for the decimator counter. Thus, when the decimator begins counting, it will start at the decimation rate value adjusted by the adjustment value. This shifts the time at which the decimator provides a sample output accordingly. A particular embodiment for a decimator adjustment is depicted in table 918. Table 918 includes count adjustments correlated to the synchronization error for a base decimation rate of 48. In this instance, the synchronization error represents the decimator count value corresponding to the highest OSPwrMax error point determined consistent with the process described in FIG. 7. Once the error is determined, the process can end per block 920.

Figure 10A:
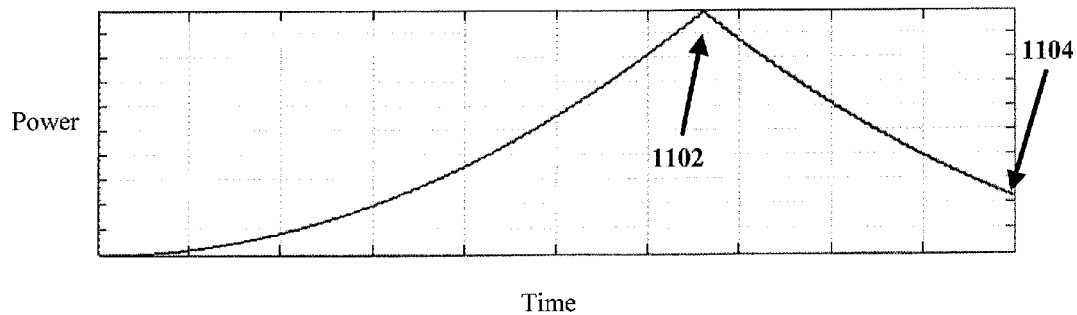
FIG. 10A is a graph of an oversampled signal with a synchronization error, consistent with embodiments of the present disclosure.

FIG. 10A is a graph of an oversampled signal with a synchronization error, consistent with embodiments of the present disclosure. The curved line represents the power value (e.g., $OSPwr=ReOS^2+ImOS^2$). The entire graph corresponds to one full decimator cycle. The power peak, indicated by arrow 1102, represents a likely symbol boundary point. The end of the graph, indicated by arrow 1104, represents the desired location of the symbol boundary point. The location of arrow 1104 is only 66% of the way to the end of the graph. Accordingly, the graph of FIG. 10A represents at 66% error.

Figure 10B:
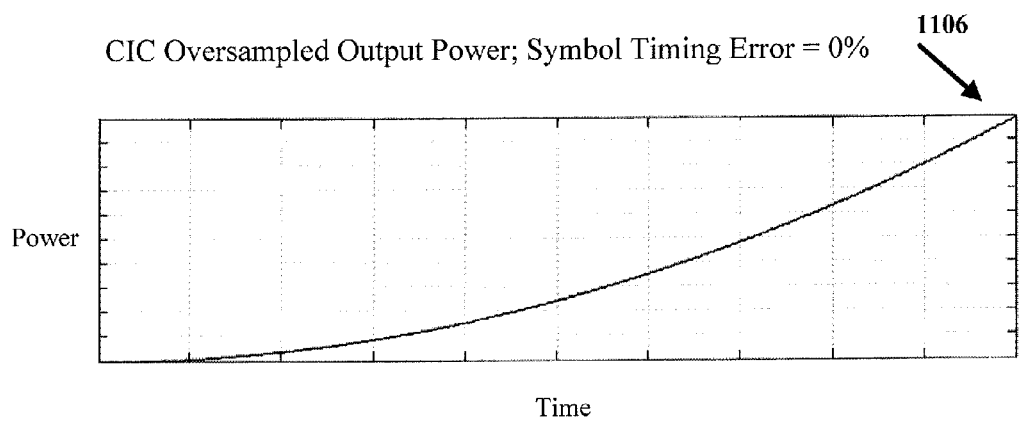
FIG. 10B is a graph of an oversampled signal with no synchronization error, consistent with embodiments of the present disclosure.

FIG. 10A is a graph of an oversampled signal with no synchronization error, consistent with embodiments of the present disclosure. In FIG. 10B, the end of the graph and the peak power coincide as indicated by arrow 1106. This represents synchronization or 0% error.

Figure 11:
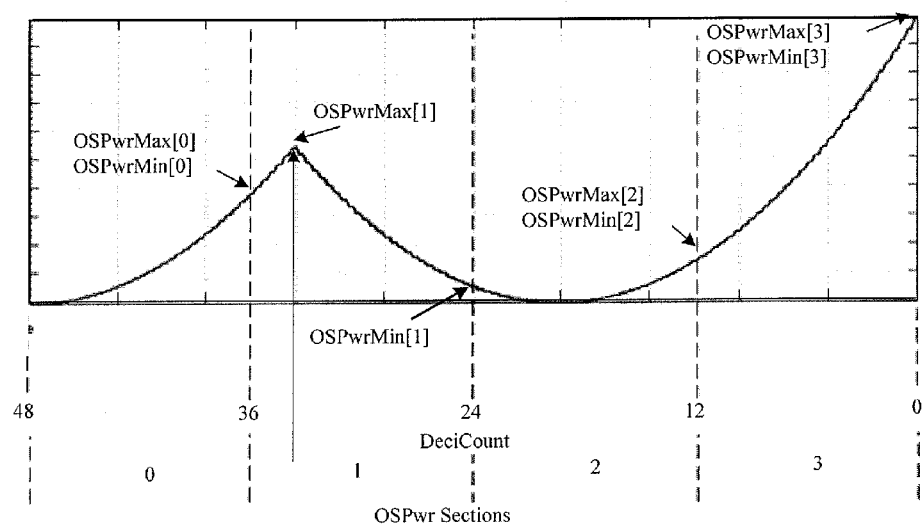
FIG. 11 is a graph of an oversampled signal, consistent with embodiments of the present disclosure.

FIG. 11 is a graph of an oversampled signal, consistent with embodiments of the present disclosure. The curved line represents the power value (e.g., $OSPwr=ReOS^2+ImOS^2$). The dotted vertical lines represent the division point between the four sections. According to the various embodiments discussed in the present disclosure, a maximum (OSPwrMax[i]) and minimum (OSPwrMin[i] power can be stored for each section "i." The decimator count (DeciCount) is also stored for each of the points of maximum and minimum power.

Regarding section 0, the maximum and minimum powers are the same value. Referring back to FIG. 7, the minimum value is set to the maximum value until and unless the power begins to decrease after reaching the maximum power. Thus, FIG. 11 shows maximum and minimum powers being set to the same value, which coincides with the end section 0. Sections 2 and 3 are similar to section 0 in that the values for their maximum and minimum are the same (although the values differ for each section).

Regarding section 1, the maximum and minimum powers are not set to different values. They would also have different values stored for their respective decimator counts (DeciCount[i]).

Referring back to FIG. 9, sections 0, 2 and 3 would not be used to determine the synchronization error because the DeltaOSPwr would not exceed the threshold value (i.e., they would be zero). Section 1, however, has a non-zero value for DeltaOSPwr. Assuming that this DeltaOSPwr value exceeds the threshold value, the maximum power of section 1 would determine the synchronization error. In the graph of FIG. 11, the DeciCount for this maximum power is 34. The corresponding adjustment value from table 918 is 9. This adjustment value will then be added to change the decimator count and thereby compensate for the error.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. In another example, in some context it should be recognized that a signal can be represented by one or more digital values shared between different software components or modules. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure.

Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on how the decimator count is updated and adjusted. Such modifications and changes do not depart from the true spirit and scope of the present disclosure, including aspects set forth in the following claims.

What is claimed is:

1. A method for receiving data communications over power distribution lines that carry power using alternating current (AC), the method comprising:
   receiving an input signal representing the data communications over power distribution lines;
   in response to intermediary signals from each of a real portion of the input signal and an imaginary portion of the input signal, detecting symbol boundaries by processing the intermediary signals at an initial sample rate; and
   reducing or decimating the initial sample rate of the intermediary signals by using a data-sampler circuit, and in response to a signal strength corresponding to the data communications:
      filtering the intermediary signals at the reduced sample rate; and
      in response to a timing mismatch between the symbol boundaries and samples corresponding to the reduced sample rate, adjusting the reduction or decimation rate in response to the determined timing mismatch.

2. The method of claim 1, further including using a processing circuit to detect symbol boundaries by monitoring the input signal at the initial sample rate and detecting signal power peaks occurring between samples corresponding to the reduced sample rate.

3. The method of claim 1, further including using a processing circuit to determine the timing mismatch using the number of samples, at the initial sample rate, between a detected symbol boundary and a next sample corresponding to the reduced sample rate.

4. The method of claim 1, further including using a filter to provide the filtered intermediary signals, and further including decoding phase-encoded symbols carried by the intermediary signals.

5. The method of claim 1, further including using a processing circuit to provide delta phase discrimination and symbol decoding of the filtered intermediary signals.

6. The method of claim 1, further including a filter circuit to provide the intermediary signals, and to provide a feedback component that is responsive to the decimation rate.

7. The method of claim 1, further including providing the timing mismatch for a set of synchronization symbols by ignoring timing data for a first two synchronization symbols of the set of synchronization symbols.

8. The method of claim 1, further including performing the above steps for each of multiple channels that have different frequencies.

9. The method of claim 8, further including using a processing circuit to provide bandpass filtering for the multiple channels and frequencies.

10. An apparatus used with data communications sent and received over power distribution lines that carry power using alternating current (AC), the apparatus comprising:
    means for receiving an input signal representing the data communications over power distribution lines;
    means, responsive to intermediary signals from each of a real portion of the input signal and an imaginary portion of the input signal, for detecting symbol boundaries by processing the intermediary signals at an initial sample rate; and
    means for reducing or decimating the initial sample rate of the intermediary signals by using a data-sampler circuit, and in response to a signal strength corresponding to the data communications including:
       a filter configured and arranged to filter the intermediary signals at the reduced sample rate; and
       a circuit, configured to be responsive to a timing mismatch between the symbol boundaries and samples corresponding to the reduced sample rate, for adjusting the reduction or decimation rate in response to the determined timing mismatch.

11. An apparatus used with data communications sent and received over power distribution lines that carry power using alternating current (AC), the apparatus comprising:
    a signal-receiving circuit configured to receive an input signal representing the data communications over power distribution lines;
    a symbol-detection circuit, responsive to intermediary signals from each of a real portion of the input signal and an imaginary portion of the input signal, configured for detecting symbol boundaries by processing the intermediary signals at an initial sample rate; and
    a rate-reduction circuit configured to reduce or decimate the initial sample rate of the intermediary signals by using a data-sampler circuit, and including circuitry configured to respond to a signal strength corresponding to the data communications by:
       filtering the intermediary signals at the reduced sample rate; and
       adjusting the reduction or decimation rate, in response to a timing mismatch between the symbol boundaries and samples corresponding to the reduced sample rate and in response to the determined timing mismatch.

12. The apparatus of claim 11, further including computer processing circuitry configured to detect symbol boundaries by monitoring the input signal at the initial sample rate and detecting signal power peaks occurring between samples corresponding to the reduced sample rate.

13. The apparatus of claim 11, further including using processing circuitry configured to determine the timing mismatch using the number of samples, at the initial sample rate, between a detected symbol boundary and a next sample corresponding to the reduced sample rate.

14. The apparatus of claim 11, further including using a filter to provide the filtered intermediary signals, and further including decoding circuitry configured to decode phase-encoded symbols carried by the intermediary signals.

15. The apparatus of claim 11, further including computer processor circuitry configured to provide delta phase discrimination and symbol decoding of the filtered intermediary signals.

16. The apparatus of claim 11, further including circuitry configured to provide the intermediary signals, and to provide a feedback component that is responsive to the decimation rate.

17. The apparatus of claim 11, further including circuitry configured to provide the timing mismatch for a set of synchronization symbols by ignoring timing data for a first two synchronization symbols of the set of synchronization symbols.

18. The apparatus of claim 11, further including circuitry configured to perform the filtering and adjusting for each of multiple channels that have different frequencies.

19. The apparatus of claim 18, further including a processing circuit configured to provide bandpass filtering for the multiple channels and frequencies.

* * * * *